US012585211B2

(12) United States Patent
Katagiri et al.

(10) Patent No.: US 12,585,211 B2
(45) Date of Patent: Mar. 24, 2026

(54) IMAGE FORMING APPARATUS

(71) Applicant: CANON KABUSHIKI KAISHA, Tokyo (JP)

(72) Inventors: Hiroko Katagiri, Tokyo (JP); Shuichi Tetsuno, Kanagawa (JP); Toshihiko Takayama, Kanagawa (JP); Mikihiko Hamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/781,015

(22) Filed: Jul. 23, 2024

(65) Prior Publication Data

US 2025/0036041 A1 Jan. 30, 2025

(30) Foreign Application Priority Data

Jul. 27, 2023 (JP) ................................. 2023-122745

(51) Int. Cl.
*G03G 15/06* (2006.01)
*G03G 15/00* (2006.01)
(Continued)

(52) U.S. Cl.
CPC ....... *G03G 15/065* (2013.01); *G03G 15/0266* (2013.01); *G03G 15/043* (2013.01); (Continued)

(58) Field of Classification Search
CPC ........... G03G 21/0064; G03G 15/0266; G03G 15/065; G03G 15/50; G03G 15/5033; G03G 15/5037
See application file for complete search history.

(56) References Cited

U.S. PATENT DOCUMENTS 6,611,669 B2 8/2003 Suzuki et al.
2008/0069590 A1* 3/2008 Shigehiro .......... G03G 21/0064 399/149
(Continued)

FOREIGN PATENT DOCUMENTS

JP 2001183905 A 7/2001
JP 2002049232 A 2/2002
(Continued)

*Primary Examiner* — Carla J Therrien
(74) *Attorney, Agent, or Firm* — ROSSI, KIMMS & McDOWELL LLP

(57) ABSTRACT

An additive coating is executed, where an additive is transferred, from a developing roller to a photosensitive drum by setting a surface potential of the drum to be lower than a developing voltage, and from the drum to a charging roller by setting a charging voltage to be lower than the surface potential. By setting a potential difference Vback between the surface potential and a developing voltage in a developing portion to be larger in the external additive coating than that in the image forming, a development amount of the additive is increased. Further, by setting a transfer voltage to be higher than the surface potential, transfer of the additive is suppressed. By setting the potential difference between the surface potential and the transfer voltage to be smaller than a discharge threshold between the transfer roller and the drum, the additive is suppressed from having a strong positive polarity.

17 Claims, 9 Drawing Sheets

EXTERNAL ADDITIVE COATING OPERATION

(51) Int. Cl.
*G03G 15/02* (2006.01)
*G03G 15/043* (2006.01)
*G03G 15/16* (2006.01)
*G03G 21/00* (2006.01)
*G03G 9/097* (2006.01)

(52) U.S. Cl.
CPC ......... *G03G 15/50* (2013.01); *G03G 21/0064* (2013.01); *G03G 9/09708* (2013.01); *G03G 15/1605* (2013.01)

(56) References Cited

U.S. PATENT DOCUMENTS

| | | | | |
|---|---|---|---|---|
| 2010/0061764 A1* | 3/2010 | Yamada | G03G 15/065 399/170 |
| 2024/0219858 A1* | 7/2024 | Tokiwa | G03G 9/097 |

FOREIGN PATENT DOCUMENTS

| | | |
|---|---|---|
| JP | 2005258322 A | 9/2005 |
| JP | 2005300751 A | 10/2005 |

* cited by examiner

EXTERNAL ADDITIVE COATING OPERATION

CLEANING OPERATION

IMAGE FORMING OPERATION

EXTERNAL ADDITIVE COATING OPERATION

EXTERNAL ADDITIVE COATING OPERATION

IMAGE FORMING APPARATUS

BACKGROUND OF THE INVENTION

Field of the Invention

The present invention relates to an image forming apparatus.

Description of the Related Art

Conventionally, an imaging apparatus, such as a copier and a printer, that forms images using an electrophotographic process is known. Such an image forming apparatus electrostatically transfers a toner image, which is formed on a surface of a photosensitive drum, i.e., image bearing member, onto a recording material or the like in a transfer step, by applying voltage from a power supply to a transfer member which is disposed facing the photosensitive drum. Then, an image is formed by fixing the toner image onto the recording material using a fixing unit.

As means for collecting untransferred toner remaining on the photosensitive drum, Japanese Patent Application Publication No. 2001-183905 proposes a cleanerless (simultaneous developing-cleaning) type image forming apparatus, which collects the toner on the photosensitive drum using a developing apparatus so as to reuse the toner.

In a case of an image forming apparatus that is a cleanerless type and is also a contact charging type which performs charging in a state of contacting the drum, a foreign substance may be transferred to the photosensitive drum through a recording material during an image forming operation, and then be transferred to a charging roller. If the foreign substance remains on the surface of the charging roller thereafter, the foreign substance adhering to the charging roller may scratch the surface of the photosensitive drum. In this case, the desired potential may not be reached at the scratched portion, which may generate an image defect.

SUMMARY OF THE INVENTION

It is an object of the present invention to suppress image defects in a cleanerless type and contact charging type image forming apparatus.

According to an aspect of the present disclosure, an image forming apparatus of the present disclosure includes:

- a photosensitive drum which is rotatable;
- a charging unit that rotates in contact with the photosensitive drum, and charges a surface of the photosensitive drum;
- an exposing unit that exposes the surface of the photosensitive drum charged by the charging unit;
- a developing unit that supplies toner containing an external additive which has a charging polarity that is an opposite polarity of a charging polarity of the toner to the surface of the photosensitive drum exposed by the exposing unit;
- a transfer unit that transfers the toner, which has been supplied to the photosensitive drum by the developing unit, to a recording material; and
- a controller that controls the charging unit, the developing unit and the transfer unit, wherein, after the toner supplied to the surface of the photosensitive drum is transferred to the recording material, the developing unit is configured to collect toner remaining on the surface of the photosensitive drum, wherein the controller is configured to perform: an image forming operation to form an image on the recording material; and an external additive coating operation to transfer the external additive or the toner containing the external additive from the developing unit to the photosensitive drum, and transfer the external additive from the photosensitive drum to the charging unit, and wherein the controller is configured not to perform exposure by the exposing unit in the external additive coating operation, and configured to control voltages so as to satisfy:

$$Vrg > Vdg2$$

$$Vdg1 > Vcg$$

$$\text{Vback\_g} > \text{Vback\_p}$$

$$Vtg > Vdg3$$

$$Vtg - Vdg3 < Vtth,$$

where V1>V2 represents a potential relationship in which an electrostatic force, directed from a position of a potential V1 to a position of a potential V2, acts on particles having a same charging polarity as a charging polarity of the external additive, Vcg represents a charging voltage in the external additive coating operation, Vdg1 represents a surface potential of the photosensitive drum, Vdg2 represents a surface potential of the photosensitive drum in a developing portion facing the developing unit, Vdg3 represents a surface potential of the photosensitive drum in a transfer portion facing the transfer unit, Vrg represents a developing voltage to be applied to the developing unit, Vtg represents a transfer voltage to be applied to the transfer unit, Vtth represents a threshold of a potential difference with which discharge is generated between the transfer unit and the photosensitive drum, Vback_g represents a potential difference between the developing voltage and the surface potential of the photosensitive drum in the developing portion, and Vback_p represents a potential difference between the developing voltage and the surface potential of the photosensitive drum in the developing portion in the image forming operation.

According to another aspect of the present disclosure, an image forming apparatus of the present disclosure includes:

- a photosensitive drum which is rotatable;
- a charging unit that rotates in contact with the photosensitive drum, and charges a surface of the photosensitive drum;
- an exposing unit that exposes the surface of the photosensitive drum charged by the charging unit;
- a developing unit that supplies toner containing an external additive which has a charging polarity that is an opposite polarity of a charging polarity of the toner to the surface of the photosensitive drum exposed by the exposing unit;
- a transfer unit that transfers the toner, which has been supplied to the photosensitive drum by the developing unit, to a recording material; and a controller that controls the charging unit, the developing unit and the transfer unit, wherein, after the toner supplied to the surface of the photosensitive drum is transferred to the recording material, the developing unit is configured to collect toner remaining on the surface of the photosensitive drum, wherein the controller is configured to perform: an image forming operation to form an image on the recording material; and an external additive coating operation to transfer the external additive or the toner containing the external additive from the developing unit to the photosensitive drum, and transfer the external additive from the photosensitive drum to the charging unit, and wherein the controller is configured to perform exposure by the exposing unit on an entire region in a direction intersecting with a circumferential direction of the photosensitive drum in the external additive coating operation, and configured to control voltages so as to satisfy:

$$Vlg2 > Vrg$$

$$Vlg1 > Vcg$$

$$Vtg = Vlg3$$

where V1>V2 represents a potential relationship in which an electrostatic force, directed from a position of a potential V1 to a position of a potential V2, acts on particles having a same charging polarity as a charging polarity of the external additive, Vcg represents a charging voltage in the external additive coating operation, Vlg1 represents a surface potential of the photosensitive drum, Vlg2 represents a surface potential of the photosensitive drum in a developing portion facing the developing unit, Vlg3 represents a surface potential of the photosensitive drum in a transfer portion facing the transfer unit, Vrg represents a developing voltage to be applied to the developing unit, and Vtg represents a transfer voltage to be applied to the transfer unit.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. However, dimensions, materials and shapes of composing elements described in the following embodiments, relative positions thereof, and the like may be changed appropriately depending on the configuration and various conditions of an apparatus to which the present invention is applied. Hence, description of the embodiments is not intended to limit the scope of the invention, unless otherwise specified.

Embodiment 1

Figure 1:
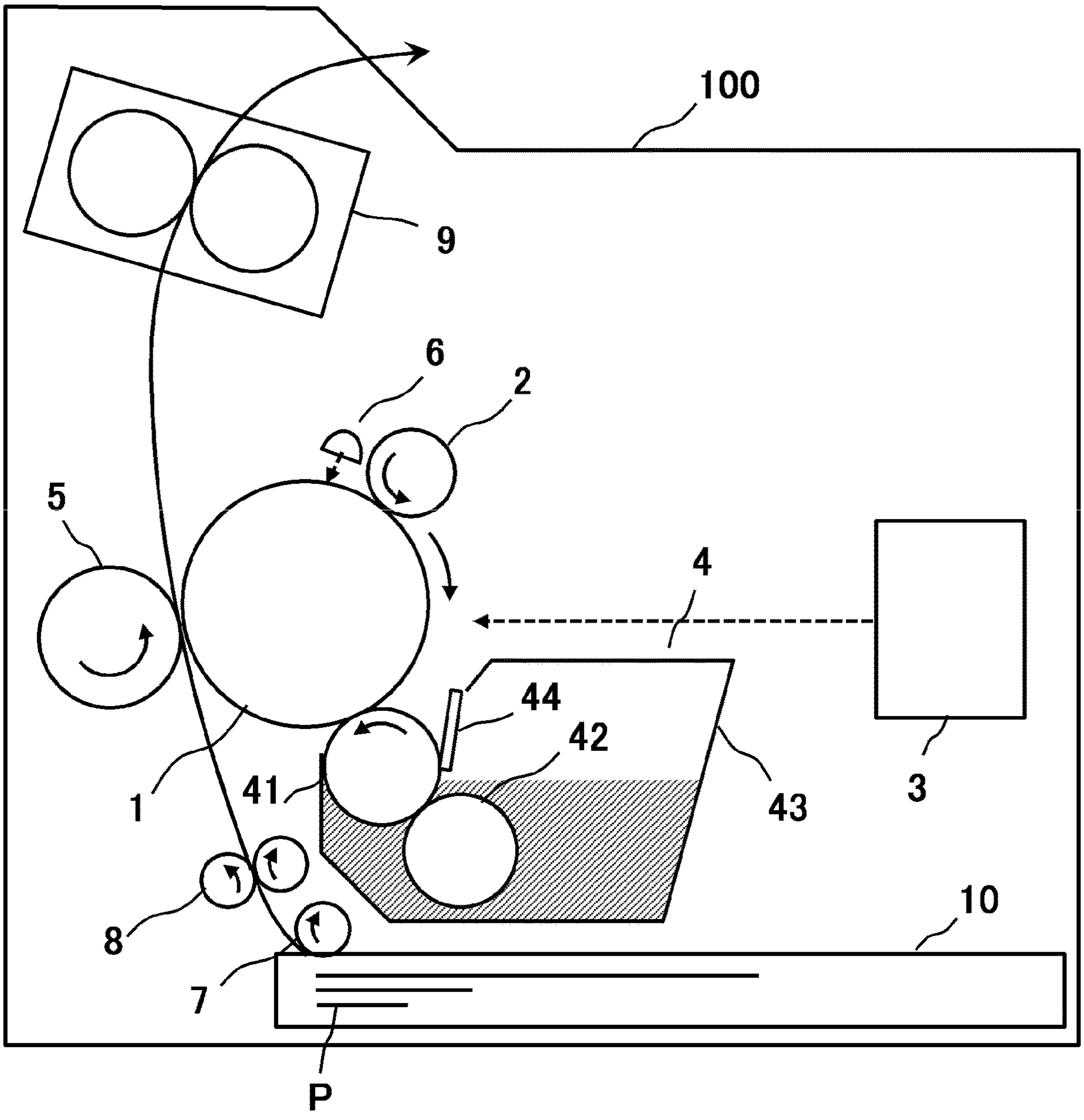
FIG. 1 is a cross-sectional view of an image forming apparatus of Embodiment 1.

FIG. 1 is a schematic diagram depicting an image forming apparatus of Embodiment 1. The image forming apparatus 100 of Embodiment 1 is a monochrome laser beam printer which uses the cleanerless system and the contact charging system.

In the image forming apparatus 10 of Embodiment 1, a rotatable cylindrical electrophotographic photosensitive member (hereafter photosensitive drum) 1 is disposed as an image bearing member. Around the photosensitive drum 1, a charging roller 2 (charging unit), an exposing apparatus 3 (exposing unit), a developing apparatus 4 (developing unit), a transfer roller 5 (transfer unit), and a pre-charging exposing apparatus 6 (means for eliminating charging potential) are disposed. In the following description, it is assumed that a lateral direction is a direction vertical to a rotation shaft direction of the photosensitive drum 1, and a longitudinal direction is a direction parallel with the rotation shaft direction of the photosensitive drum 1.

The photosensitive drum 1 is an image bearing member that is rotary-driven in the arrow direction and bears a toner image. A control unit 99 (see FIG. 2), such as a controller, receives image signals from an external apparatus 130 (see FIG. 2). Thereby the image forming operation is started and the photosensitive drum 1 is rotary-driven. In the rotating process, the photosensitive drum 1 is uniformly charged by the charging roller 2, to have a predetermined polarity (negative polarity in Embodiment 1) at a predetermined potential. The photosensitive drum 1 is exposed by the exposing apparatus 3 in accordance with the image signals. Thereby an electrostatic latent image is formed. Then this electrostatic latent image is developed by the developing apparatus 4 at a developing position, and is visualized as a toner image.

The charging roller 2 is rotary-driven in a state of contacting with the photosensitive drum 1. The charging roller 2 is charging unit for charging the surface of the photosensitive drum 1 at a charging portion which is formed with the photosensitive drum 1. The charging roller 2 may be rotary-driven by the rotation of the photosensitive drum 1. The charging roller 2 has an elastic layer formed of a conductive elastic material of which surface roughness is Ra 1.5 to 2.5 μm. The charging roller 2 contacts with the surface of the photosensitive drum 1 at a predetermined contact pressure, and forms a charging portion thereby. In the charging portion, the rotating directions of the charging roller 2 and the photosensitive drum 1 are the same. The peripheral speed of the charging roller 2 is faster than the peripheral speed of the photosensitive drum 1. The charging roller 2 is rotary-driven by a charging roller driver 98 (see FIG. 2) at a 105% peripheral speed with respect to the photosensitive drum 1. To the rotation shaft of the charging roller 2, a predetermined DC voltage is applied from a charging voltage power supply 92 (See FIG. 2) in accordance with the image forming operation. Here in accordance with the image forming operation, a −1350V DC voltage is applied to the rotation shaft of the charging roller 2 as the charging voltage Vcp, and the surface of the photosensitive drum 1 is charged to −780V (predetermined potential). The surface potential of the photosensitive drum 1 was measured by a surface potential meter, Model 344 made by Trech Inc. The surface potential−780V of the photosensitive drum 1 here is a surface potential of the photosensitive drum 1 in a non-image forming region (dark area potential Vdp2), where a toner image is not developed.

The exposing apparatus 3 exposes the surface (charging surface) of the photosensitive drum 1 which is charged by the charging roller 2. The exposing apparatus 3 is exposing unit for exposing the surface of the photosensitive drum 1 in an exposing portion at the downstream side of a charging portion in the rotating direction of the photosensitive drum 1. The exposing apparatus 3 is a laser scanner apparatus. The exposing apparatus 3 emits a laser beam based on image information which is inputted from an external apparatus 130 (e.g. host computer). The exposing apparatus 3 is exposing unit for forming an electrostatic latent image on the charging surface of the photosensitive drum 1, which has been uniformly charged. In Embodiment 1, an exposure amount is adjusted such that the image forming potential of the photosensitive drum 1 in the electrostatic latent image portion (bright area potential Vlp2) after being exposed by the exposing apparatus 3 becomes −100V.

The developing apparatus 4 supplies toner, containing external additive, to the surface (exposure surface) of the photosensitive drum 1, which is exposed by the exposing apparatus 3. The developing apparatus 4 is developing unit for supplying toner, containing the external additive, to the surface of the photosensitive drum 1 in a developing portion at the downstream side of the exposing portion in the rotating direction of the photosensitive drum 1. The photosensitive drum 1 faces the developing apparatus 4 in the developing portion. The developing apparatus 4 is constituted of a developing roller 41 (developer bearing member), a toner supply roller 42 (developer supply means), a toner storage chamber 43 to store toner, and a developing blade 44. The toner is supplied from the toner storage chamber 43 to the developing roller 41 by the toner supply roller 42. The toner supplied to the developing roller 41 passes through a contact portion with the developing blade 44, whereby the toner is charged to a predetermined polarity.

The toner is non-magnetic toner of which normal polarity is negative, manufactured by the suspension polymerization method. The volume-average particle diameter of this toner is 6.0 μm, and the toner carried on the developing roller 41 is charged to negative polarity. An external additive is added to the surface of the toner. The charging polarity of the external additive is the opposite of the charging polarity of the toner. In Embodiment 1, the toner has negative polarity, and the external additive is 200 nm hydrotalcite, of which particles have positive polarity. By externally adding particles of which polarity is opposite that of the toner, polarity of the toner becomes stable. The external additive may also be a different positive type external additive, such as particles using metal (e.g. titanium) or metal oxide.

The developing roller 41 contacts with the surface of the photosensitive drum 1 at a predetermined contact pressure, and forms a developing portion thereby. The developing roller 41 is rotary-driven by a developing roller driver 90 (see FIG. 2) at 140% peripheral speed with respect to that of the photosensitive drum 1. The developing roller 41 and the photosensitive drum 1 may be configured to be driven by a common driving source. To a rotation shaft of the developing roller 41, a −380V DC voltage (developing voltage Vrp) is applied from a developing voltage power supply 93 (see FIG. 2). When an image is formed, the toner image carried on the developing roller 41 is developed in an image forming potential Vlp2 portion of the photosensitive drum 1 by an electrostatic force that is generated by the potential difference between this developing voltage −380V and the image forming potential Vlp2=−100V of the photosensitive drum 1.

The transfer roller 5 transfers the toner, supplied to the photosensitive drum 1 by the developing apparatus 4, to a recording material P, which is a transfer target object. The transfer roller 5 is transfer unit for transferring the toner on the surface of the photosensitive drum 1 to the recording material P, which is a transfer target object, in a transfer portion at the downstream side of the developing portion in the rotating direction of the photosensitive drum 1. The photosensitive drum 1 faces the transfer roller 5 in the transfer portion. The transfer roller 5 contacts with the surface of the photosensitive drum 1 at a predetermined contact pressure, and forms the transfer portion thereby. To the rotation shaft of the transfer roller 5, a predetermined voltage is applied from a transfer voltage power supply 94 (see FIG. 2) at a predetermined timing.

The pre-charging exposing apparatus 6 is pre-exposing unit for exposing the surface of the photosensitive drum 1 in a pre-charging exposing portion at the downstream side of the transfer portion and at the upstream side of the charging portion, in the rotating direction of the photosensitive drum 1. By performing exposure using the pre-charging exposing apparatus 6, lack of uniformity of the surface potential of the photosensitive drum 1 after the recording material P passing through the transfer portion can be eliminated.

The recording material P stored in a cassette 10 is fed by the paper feeding unit 7 at a timing when the toner image formed on the photosensitive drum 1 reaches the transfer portion. The recording material P is conveyed to the transfer portion via a resist roller pair 8. The toner image formed on the photosensitive drum 1 is transferred onto the recording material P by the transfer roller 5 to which a predetermined transfer voltage is being applied by the transfer voltage power supply 94.

Then the recording material P carrying the toner image is conveyed to a fixing unit 9. The recording material P is heated and pressed in the fixing unit 9. Thereby the toner is melted and fixed to the recording material P. Then the recording material P is discharged from the image forming apparatus 100.

By the above operation, a monochrome print image is formed. The image forming apparatus 100 is a cleanerless type image forming apparatus in which toner, which was not transferred to the recording material P (transfer target object) in the transfer portion, is collected by the developing apparatus 4.

In some cases a foreign substance existing in the image forming apparatus 100 or entering from outside of the image forming apparatus 100 may be conveyed with the recording material P to the transfer portion, then transferred to the photosensitive drum 1 in the transfer portion. In another case, the foreign substance may be transferred to the charging roller 2 in the charging portion, and may adhere to and remain on the charging roller 2. In this case, the foreign substance may scratch the surface of the photosensitive drum 1. If the scratch is deep, a charge holding capability of the surface of the photosensitive drum 1 drops. Then the toner is developed in the scratched portion on the photosensitive drum 1 in the developing portion, and a black spot image may be generated. In particular, under a high temperature high humidity environment, charges around the scratched portion of the photosensitive drum 1 tend to flow into the scratched portion where resistance is low. Therefore, the black spot image tends to stand out even more. The foreign substance here is, for example, a piece of metal, a piece of resin, a mineral (e.g. quartz) or the like. Such a relatively hard foreign substance easily scratches the photosensitive drum 1, causing the black spot image. Adhesion of the foreign substance to the charging roller 2 is more easily generated if tackiness of the surface of the charging roller 2 is high. This means that in an early stage of operation, where there is no adhesion of the toner to the surface of the charging roller 2 and tackiness is high, adhesion of a foreign substance to the charging roller 2 is likely to occur.

To solve this problem, in Embodiment 1, an external additive coating operation, to adhere a predetermined amount of an external additive to the charging roller 2, is performed in an early stage of operation of the charging roller 2. In the external additive coating operation, an external additive or a toner containing an external additive is transferred from the developing roller 41 to the photosensitive drum 1. Further, the external additive is transferred from the photosensitive drum 1 to the charging roller 2. In the external additive coating operation, the charging voltage, the developing voltage, the transfer voltage and the exposure amount are controlled so that this transfer of the external additive or the toner containing the external additive is implemented. The "early stage of operation" here is, for example, a case where the charging roller 2 is brand new, a case where a number of times of rotation of the charging roller 2 is less than a threshold, or a case where the image forming operation is not yet executed or a number of times of executing the image forming operation is less than a threshold. In the following description, a case of performing the external additive coating operation when the charging roller 2 is brand new will be described as an example. The effect to decrease the tackiness can be obtained even if toner, instead of the external additive, is adhered to the charging roller 2. However, the effect of decreasing the tackiness is higher if the external additive is adhered.

Figure 3:
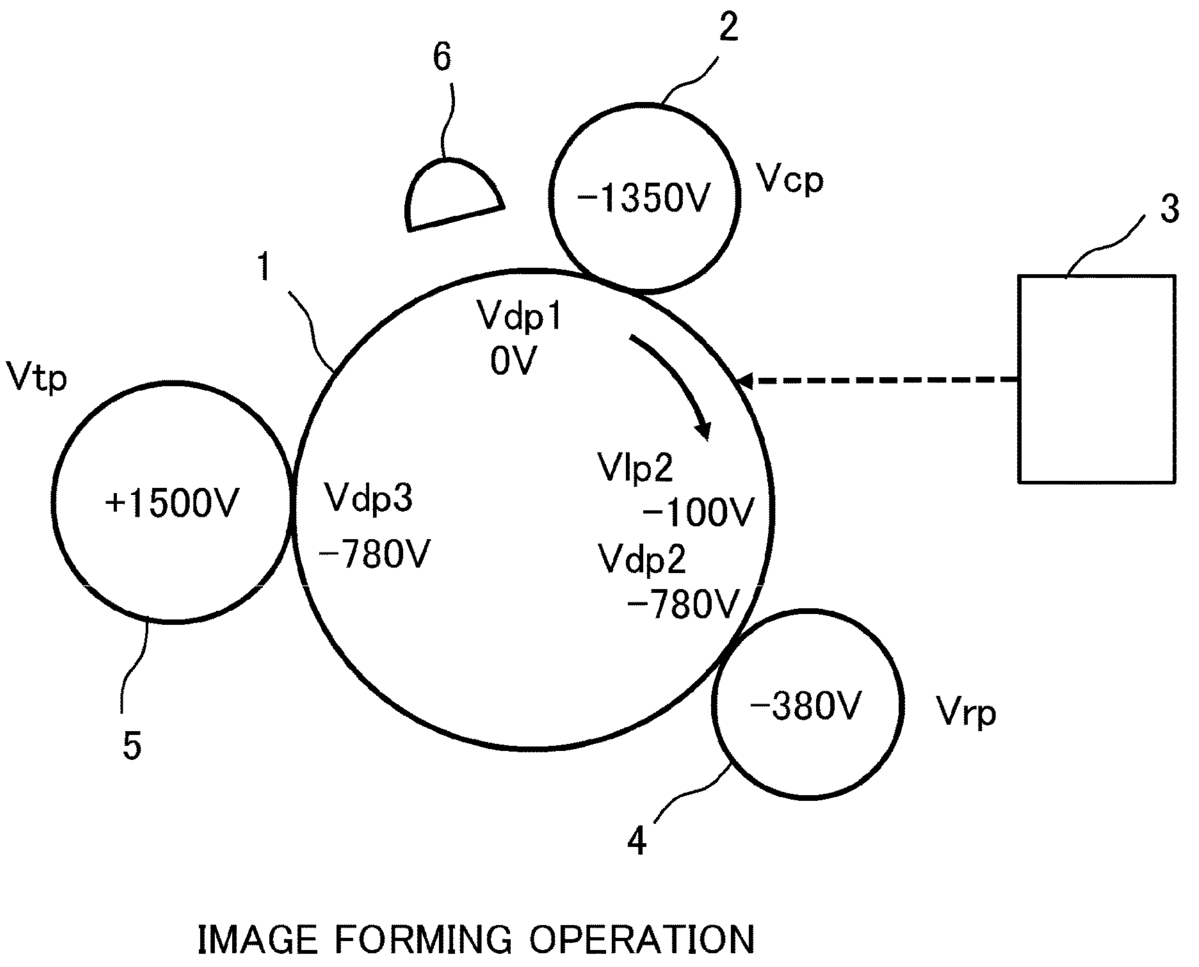
FIG. 3 is a diagram for describing an image forming operation of Embodiment 1.

The reason why the effect of decreasing the tackiness is higher in coating with the external additive than with coating toner will be described. FIG. 3 indicates the surface potential that is formed on the photosensitive drum 1 in the image forming operation, and the applied voltage to each member. It is assumed that Vdp1 is the surface potential immediately before the charging portion of the photosensitive drum 1 in the image forming operation, Vdp2 is the surface potential of a region which is not exposed by the exposing apparatus 3 immediately before the developing portion, Vlp2 is the surface potential of the exposed region, and Vdp3 is the surface potential immediately before the transfer portion. It is also assumed that Vcp is the charging voltage, Vrp is the developing voltage, and Vtp is the transfer voltage in the image forming operation. In Embodiment 1, the pre-charging exposure is performed by the pre-charging exposing apparatus 6 (pre-charging exposure ON), and Vdp1 becomes 0V. It is assumed that the charging voltage Vcp is −1350V, the dark area potential Vdp2 in the developing portion of the photosensitive drum 1 is −780V, the bright area potential Vlp2 therein is −100V, the dark area potential Vdp3 in the transfer portion is −780V, the developing voltage Vrp is −380V, and the transfer voltage Vtp is +1500V.

In Embodiment 1, the charging roller 2 and the photosensitive drum 1 are rotated with a peripheral speed difference. Therefore, the toner on the charging roller 2 is likely to be charged to negative polarity by rubbing. In the image forming operation in FIG. 3, the charging voltage Vcp is higher in the negative polarity side than the potential Vdp1 of the photosensitive drum 1 immediately before the charging portion. In the case of this potential relationship, the toner having negative polarity adhering to the charging roller 2 is discharged to the photosensitive drum 1. The external additive, on the other hand, has a charging polarity (positive polarity) which is the opposite of the polarity of the toner. Therefore, the polarity of the external additive does not easily become negative polarity even if it is rubbed on the charging roller 2, and the external additive is not easily discharged from the charging roller 2 to the photosensitive drum 1. Furthermore, the particle size of the external additive of Embodiment 1 is 1/10 or less than that of toner. Therefore, regardless the irregularity of the surface of the charging roller 2, the external additive can be coated more uniformly than toner. Hence the particles to be adhered to the charging roller 2 are preferably the external additive, which is less likely to be discharged from the charging roller 2, and more easily coated uniformly compared with toner.

The external additive coating operation will be described. The external additive coating operation is an operation sequence to develop the external additive on the photosensitive drum 1 in the developing portion, and then transfer the external additive to the charging roller 2 efficiently without generating a discharge in the transfer portion and the charging portion.

Figure 2:
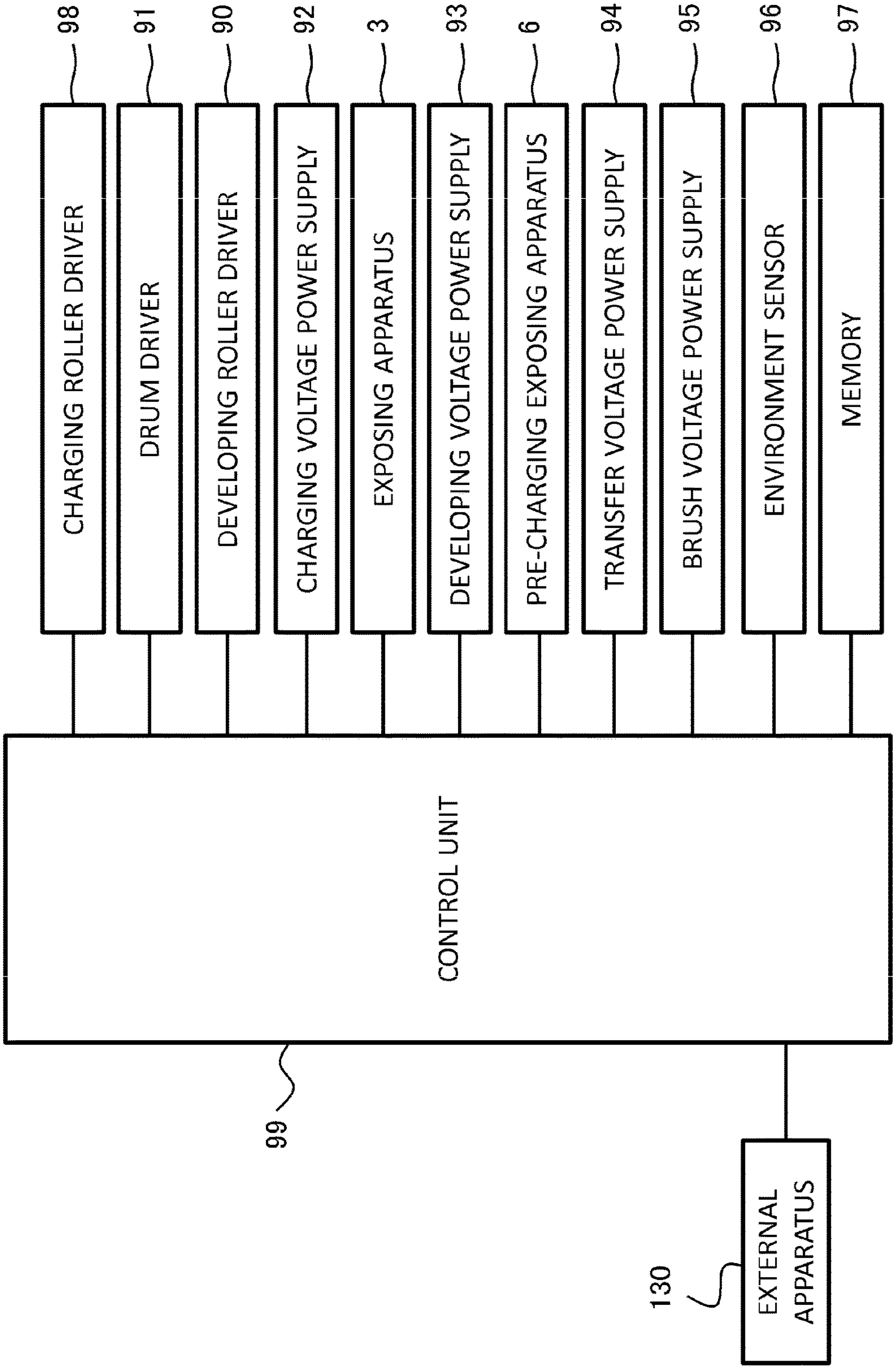
FIG. 2 is a control block diagram of Embodiment 1.

The external additive coating operation is executed by the control unit 99, which is controller disposed in the image forming apparatus 100. FIG. 2 is a block diagram indicating the control unit 99 and various composing elements of the image forming apparatus 100 controlled by the control unit 99. The control unit 99 controls the drum driver 91, and rotary-drives the photosensitive drum 1. The control unit 99 also controls the charging voltage power supply 92 and applies DC voltage (charging voltage) to the charging roller 2, and controls the exposing apparatus 3 and exposes the photosensitive drum 1. The control unit 99 also controls the charging roller driver 98, and rotary drives the charging roller 2. Further, the control unit 99 controls the developing voltage power supply 93, and applies DC voltage (developing voltage) to the developing apparatus 4. The control unit 99 also controls the pre-charging exposing apparatus 6, and exposes the photosensitive drum 1 at a position on the upstream side of the charging portion. The control unit 99 also controls the transfer voltage power supply 94, and applies the DC voltage (transfer voltage) to the transfer roller 5. Furthermore, the control unit 99 determines whether or not the image forming apparatus 100 is brand new. For example, information that an image forming apparatus 100 is brand new is stored in a memory 97 before shipment, and when the external additive coating operation is correctly executed, this information indicating the brand new state is updated to the information indicating the image forming apparatus 100 is in the state of operation. The control unit 99 also acquires information on the operation environment of the image forming apparatus 100 using an environment sensor 96. The environment sensor 96 is an acquiring unit for acquiring information on the operating environment of the image forming apparatus 100. Examples of the environment sensor 96 are a temperature sensor and a humidity sensor. In the case of the later mentioned configuration equipped with a brush member 11, the control unit 99 controls a brush voltage power supply 95, and applies voltage to the brush member 11. In the case of the configuration not equipped with the brush member 11, the brush voltage power supply 95 is not included. The power supply to apply voltage to the brush member 11 may be shared with another power supply (e.g. developing voltage power supply 93), so that the power supply to apply voltage to the brush member 11 is not separately provided.

Figure 4:
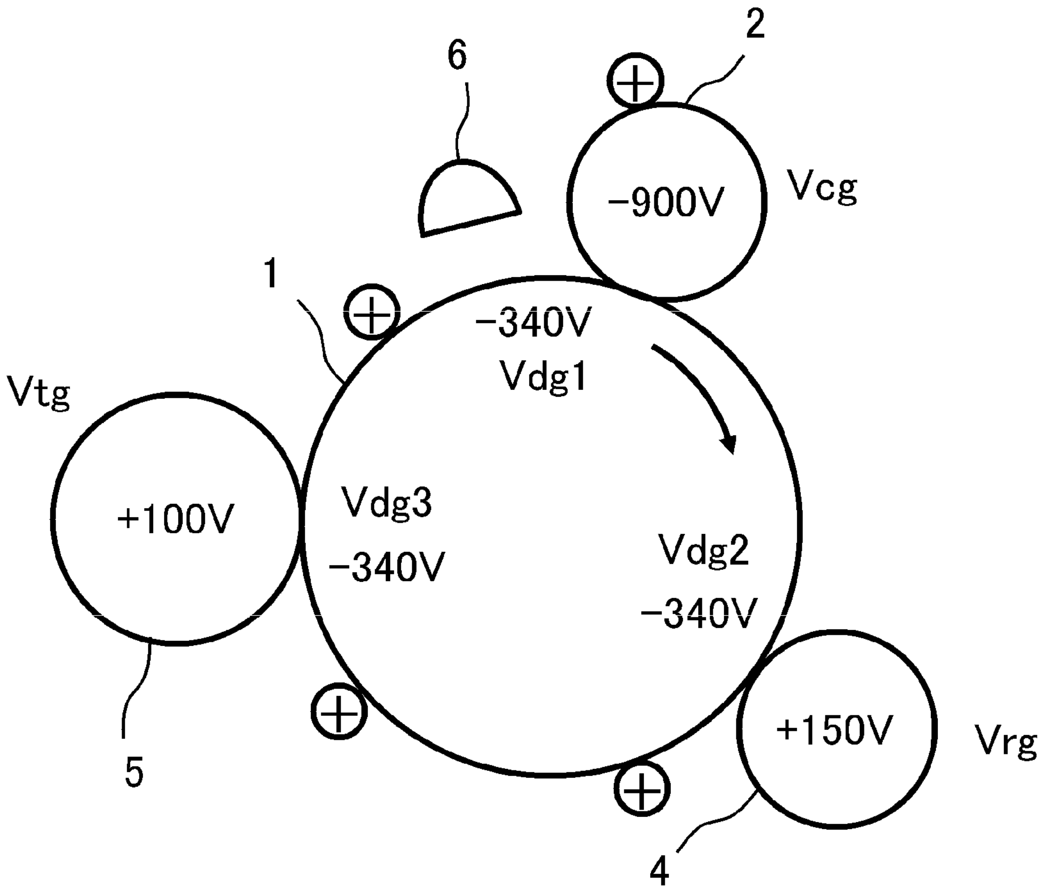
FIG. 4 is a diagram for describing an external additive coating operation of Embodiment 1.

FIG. 4 indicates the surface potential that is formed on the photosensitive drum 1 in the external additive coating operation, and the applied voltage to each member. It is assumed that Vdg1 is the surface potential immediately before the charging portion of the photosensitive drum 1 in the external additive coating operation, Vdg2 is the surface potential immediately before the developing portion, and Vdg3 is the surface potential immediately before the transfer portion. It is also assumed that Vcg is the charging voltage, Vrg is the developing voltage, and Vtg is the transfer voltage in the external additive coating operation. In the following description, the potential relationship when an electrostatic force acts on particles having the charging polarity of the external apparatus, in the direction from the position at the potential V1 to the position at the potential V2, is expressed by V1>V2. In Embodiment 1, the charging polarity of the external additive is positive polarity, hence if V1=+150V and V2=−340V, for example, the potential relationship V1>V2 described above is satisfied. In the case where the charging polarity of the external additive is negative polarity, if V1=−380V and V2=−100V, for example, the potential relationship V1>V2 described above is satisfied. In the external additive coating operation, exposure by the exposing apparatus 3 is not performed, and voltages are controlled so as to satisfy Vrg>Vdg2 and Vdg1>Vcg. Thereby the external additive is transferred from the developing apparatus 4 to the photosensitive drum 1, and the external additive is transferred from the photosensitive drum 1 to the charging roller 2. In Embodiment 1, exposure by the pre-charging exposing apparatus 6 is not performed, and the charging voltage Vcg=−900V, Vrg=+150V, and Vdg2=Vdg1=−340V. The charging voltage Vcg in the external additive coating operation is −900V, and the charging voltage Vcp in the image forming operation is −1350V, hence the potential relationship is Vcg>Vcp. The dark area potential Vdp2 of the developing portion in the image forming operation is −780V, and the dark area potential Vdg2 of the developing portion in the external additive coating operation is −340V.

Here it is assumed that Vback is the potential difference between the developing voltage in the developing portion and the surface potential of the charging surface of the photosensitive drum 1, Vback_p is the potential difference of the developing portion in the image forming operation, and Vback_g is the potential difference of the developing portion in the external additive coating operation. In Embodiment 1, the voltages are controlled so that Vback_g>Vback_p is satisfied in the external additive coating operation. Here Vback_g=Vrg−Vdg2 and Vback_p=Vrp−Vdp2. Thereby the external additive having the positive polarity can be developed more so than during the image forming operation, and can be transferred from the developing apparatus 4 to the photosensitive drum 1. In Embodiment 1, the potential difference Vback_g of the developing portion in the external additive coating operation is 490V, and the potential difference Vback_p of the developing portion in the image forming operation is 400V.

In the external additive coating operation, the voltages are controlled so that the potential relationship in the transfer portion becomes Vtg>Vdg3. Thereby transfer of the external additive from the photosensitive drum 1 to the transfer roller 5 can be prevented. In Embodiment 1, the transfer voltage Vtg in the external additive coating operation is +100V, and the surface potential Vdg3 of the photosensitive drum 1 in the transfer portion is −340V. Therefore, it can be prevented that the external additive having the positive polarity adheres to the transfer roller 5 in the transfer portion.

If Vtth is the threshold of the potential difference with which discharge is generated between the transfer roller 5 and the photosensitive drum 1, the voltages are controlled so that Vtg−Vdg3<Vtth is established in the external additive coating operation. Then the discharge is not generated between the photosensitive drum 1 and the transfer roller 5 in the transfer portion. Hence an increase of the charges of the external additive can be prevented. In Embodiment 1, the transfer voltage Vtg is +100V, the surface potential Vdg3 of the photosensitive drum 1 in the transfer portion is −340V, and the potential difference between the transfer roller 5 and the photosensitive drum 1 is 440V The discharge threshold Vtth between the transfer roller 5 and the photosensitive drum 1 is 600V Since discharge is not generated in the transfer portion, it can prevent the external additive from having strong positive polarity due to discharge, and prevent the external additive from strongly adhering to the photosensitive drum 1.

If Vcth is the threshold of the potential difference with which discharge is generated between the charging roller 2 and the photosensitive drum 1, the voltages are controlled so that Vdg1−Vcg<Vcth is established on the external additive coating operation. Then the discharge is not generated between the photosensitive drum 1 and the charging roller 2 in the charging portion. In Embodiment 1, Vdg1−Vcg<Vcth is implemented by not performing exposure by the pre-charging exposing apparatus 6 (pre-charging exposure OFF) in the external additive coating operation, or by reducing the exposure amount by the pre-charging exposing apparatus 6 than the amount in the image forming operation. Thereby it can be prevented that the charging polarity of the external additive becomes the same polarity as the charging polarity of the toner in the charging portion. In Embodiment 1, Vcth is 600V, and the pre-charging exposure is not performed (Vdg1=Vdg3=−340V, Vcg=−900V), hence Vdg1−Vcg<Vcth is established. Thereby it can prevent the external additive having positive polarity on the photosensitive drum 1 from becoming negative polarity, and the external additive having positive polarity is electrically transferred from the surface of the photosensitive drum 1 to the charging roller 2 efficiently.

The external additive coating operation is executed for a predetermined time, so that more external additive is adhered to the charging roller 2 than in the image forming operation, and a sufficient amount of external additive can be adhered to the charging roller 2. In Embodiment 1, the execution time of the external additive coating operation is 30 seconds. This execution time is equivalent to the time that the charging roller 2 rotates about 150 times.

The execution time of the external additive coating operation may be set in accordance with the environment information, such as temperature and humidity, detected by the environment sensor 96 installed in the image forming apparatus 100. For example, temperature may be detected by the environment sensor 96, and a longer execution time of the external additive coating operation may be set as the temperature becomes higher. Humidity may be detected instead by the environment sensor 96, and a longer execution time of the external additive coating operation may be set as the humidity becomes higher. In Embodiment 1, in a high temperature high humidity environment (temperature: 32.5° C., humidity: 80%) where black spots standout even more, the execution time of the external additive coating operation is set to about 60 seconds (equivalent to the time that the charging roller 2 rotates about 300 times). The predetermined correspondence of the environment conditions and the execution time of the external additive coating operation is stored in the memory 97 in advance. Based on the detection result by the environment sensor 96 and the correspondence stored in the memory 97, the control unit 99 can acquire the execution time of the external additive coating operation. The correspondence is, for example, the higher the temperature the longer the execution time of the external additive coating operation, or the higher the humidity the longer the execution time of the external additive coating operation. The means for controlling the external additive coating operation in accordance with the environment conditions, such as temperature and humidity, is not limited to changing the execution time, but may be changing the rotation speed, voltages, or the like of the photosensitive drum 1 and the charging roller 2. The control of the external additive coating operation in accordance with the environment conditions may be changed depending on the type of the external additive.

The effect of Embodiment 1 will be described next. In Embodiment 1, the external additive coating operation is performed before executing the image forming operation in a brand-new image forming apparatus 100. Thereby the external additive is adhered to the charging roller 2, and the adhesive force of the surface of the charging roller 2 is decreased, so as to prevent the adhesion of a foreign substance. In order to confirm the effect of Embodiment 1, a number of black spot lines that were generated was verified in Embodiment 1 and in Comparative Example 1.

This verification will be described in detail.

Figure 5:
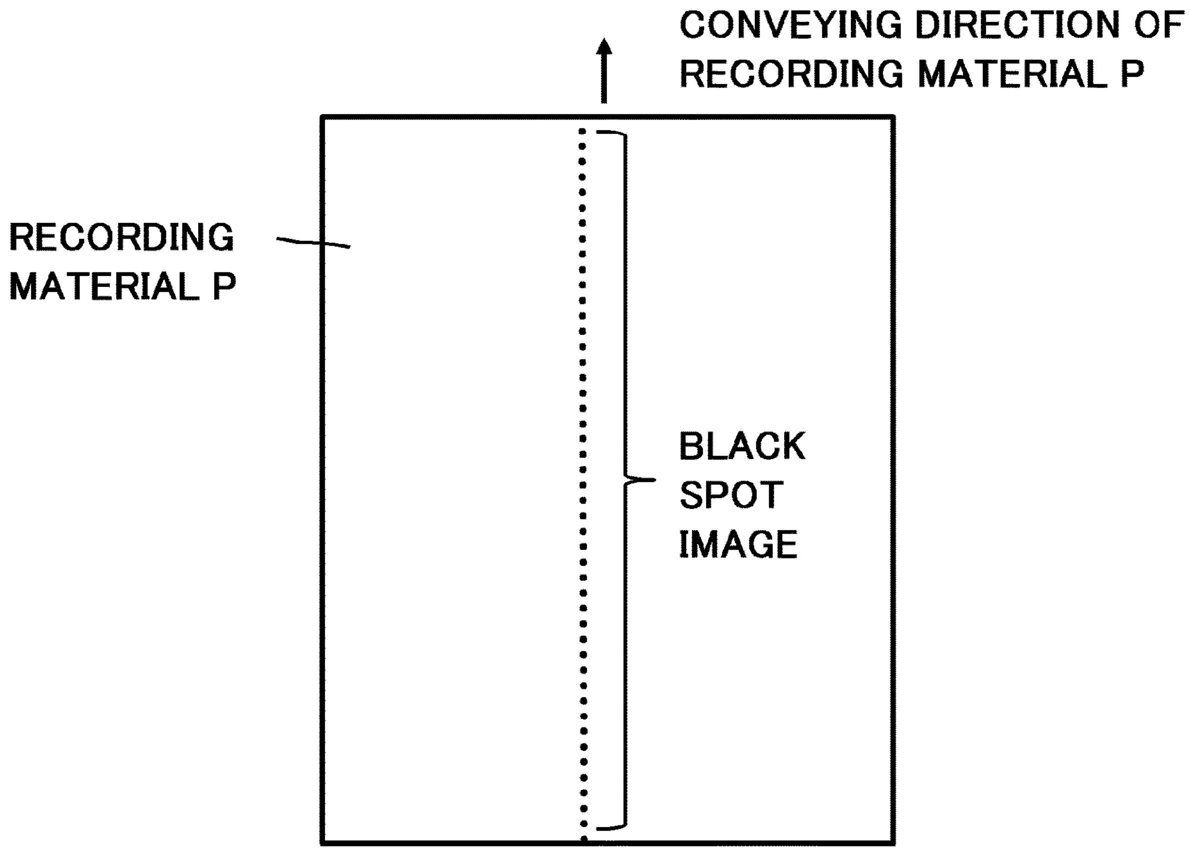
FIG. 5 is a diagram for describing a method for verifying adverse effects on an image.

To verify a number of black spot lines that were generated, one sheet of paper, on which about 500 quartz particles (particle diameter: 100 to 300 μm) are scattered, is passed, then 1000 sheets of paper free of foreign substance are passed, and the image of the 1000th sheet of paper was evaluated. The image forming apparatus that is used here is brand new, and this verification was performed under a high temperature (32.5° C.) high humidity (80%) environment. In Embodiment 1, the above evaluation was performed after the external additive coating operation was performed for 60 seconds on the brand-new image forming apparatus. In the comparative example, the above evaluation was performed on the brand-new image forming apparatus, without performing the external additive coating operation. The "number of black spot lines that were generated" here means a number of lines of black spots that were generated at a 2 mm pitch in the direction vertical to the conveying direction in the plane of the recording material P. For example, the black spot image illustrated in FIG. 5 is counted as one line. The evaluation was performed three times for Embodiment 1 and in the comparative example respectively.

Table 1 indicates a number of black spot lines that were generated in Embodiment 1 and in Comparative Example 1.

TABLE 1

| | FIRST TIME | SECOND TIME | THIRD TIME |
|---|---|---|---|
| COMPARATIVE EXAMPLE 1 | 5 LINES | 6 LINES | 4 LINES |
| EMBODIMENT 1 | 0 LINE | 0 LINE | 0 LINE |

As illustrated in Table 1, in Embodiment 1, a number of black spot lines that were generated is 0, while in Comparative Example 1, a number of black spot lines that were generated is 4 to 6, that is, performing the external additive coating operation has an effect of preventing the generation of black spots.

As described above, by performing the external additive coating operation on a brand-new image forming apparatus, adhesion of a foreign substance to the charging roller 2 can be prevented, whereby the generation of black spot images can be prevented.

Cleaning Operation

In the case where a large amount of toner has positive polarity, not only external additive but also considerable amount of toner is transferred to the charging roller 2 in the above-mentioned external additive coating operation. Therefore, after the external additive coating operation, the cleaning operation to control the charging voltage, the developing voltage and the transfer voltage may be performed so that toner adhering to the charging roller 2 is transferred to the photosensitive drum 1.

Figure 6:
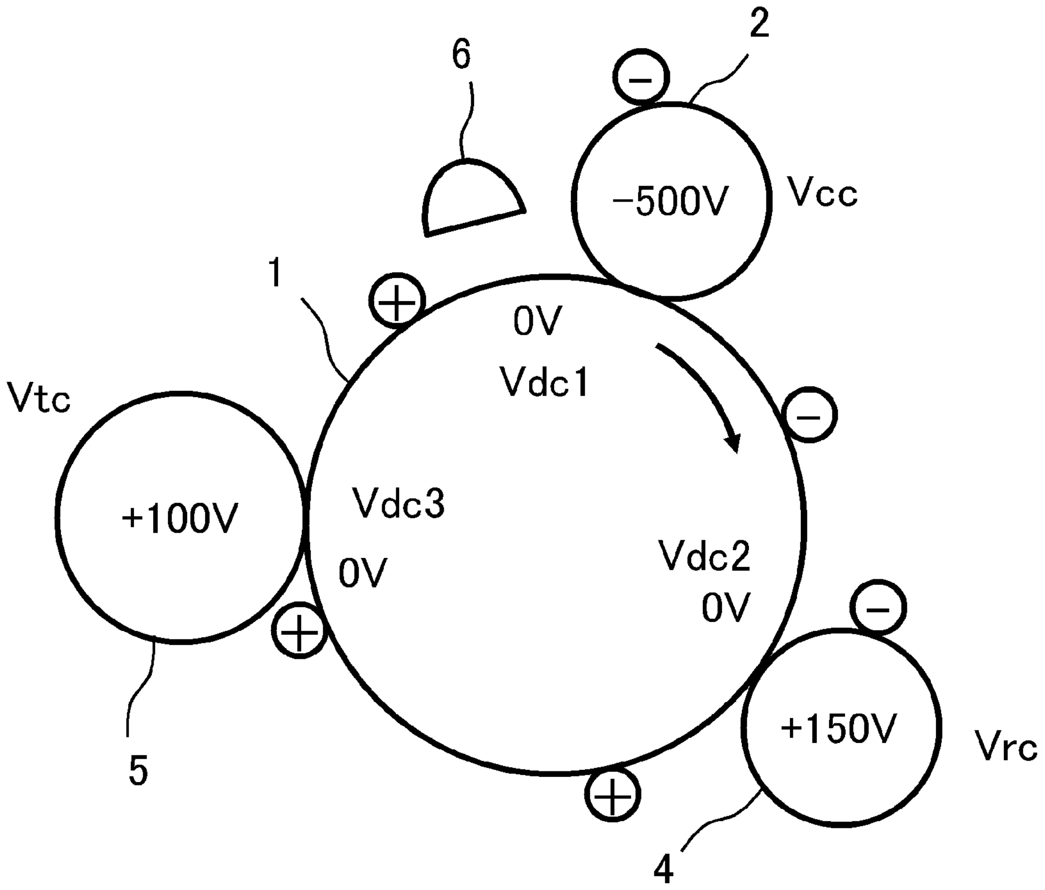
FIG. 6 is a diagram for describing a cleaning operation of Embodiment 1.

FIG. 6 indicates the surface potential that is formed on the photosensitive drum 1 in the cleaning operation, and the voltage of each member. It is assumed that Vdc1 is the surface potential of the photosensitive drum 1 in the cleaning operation immediately before the charging portion, Vdc2 is the surface potential immediately before the developing portion, Vdc3 is the surface potential immediately before the transfer portion, Vcc is the charging voltage, Vrc is the developing voltage, and Vtc is the transfer voltage. In the cleaning operation, exposure by the pre-charging exposing apparatus 6 is performed and exposure by the exposing apparatus 3 is not performed, and the voltages are controlled so as to satisfy Vdc1>Vcc and Vrc>Vdc2. Thereby the toner can be transferred from the charging roller 2 to the photosensitive drum 1, and the toner can be transferred from the photosensitive drum 1 to the developing apparatus 4. In Embodiment 1, Vdc1 is 0V, Vcc is −500V, Vrc is +150V, and Vdc2 is 0V.

In the cleaning operation, the charging roller 2 and the photosensitive drum 1 are rotary-driven in the state of applying the charging voltage having negative polarity. By rubbing with the peripheral speed difference between the charging roller 2 and the photosensitive drum 1, the toner adhering to the charging roller 2 is charged to negative polarity. Then static electricity of the photosensitive drum 1 is eliminated by the pre-charging exposing apparatus 6, and history of the charging potential of the photosensitive drum 1 before executing the clean operation is erased, so that the potential of the photosensitive drum 1 becomes approximately 0V. The toner can be transferred from the charging roller 2 onto the photosensitive drum 1 using the electrostatic repulsive force between the charging roller 2 and the toner charged to negative polarity.

If Vcth is the threshold of the potential different with which discharge is generated between the charging roller 2 and the photosensitive drum 1, the voltages may be controlled so that Vdc1−Vcc<Vcth is satisfied in the cleaning operation. Thereby it can be prevented that the toner adhering to the charging roller 2 in the charging portion is charged to an opposite polarity (positive polarity). In Embodiment 1, Vcc is −500V, Vdc1 is 0V, and Vcth is 600V Thereby it can prevent the toner adhering to the charging roller 2 from becoming positive polarity by discharge.

Since the developing voltage Vrc is +150V and the surface potential Vdc2 of the photosensitive drum 1 in the developing portion is 0V, the toner having negative polarity adhering to the photosensitive drum 1 is transferred to the developing apparatus 4.

In the cleaning operation, the voltage may be controlled so that Vtc>Vdc3 is satisfied. Thereby it can be prevented that toner charged to the opposite polarity (positive polarity) is transferred from the photosensitive drum 1 to the transfer roller 5. In the cleaning operation, the potential relationship is Vrc>Vdc2, hence the toner having positive polarity is developed in the developing portion, but by setting Vtc>Vdc3, the developed toner having positive polarity is not transferred from the transfer portion. In Embodiment 1, in the cleaning operation, Vtc is +100V, and Vdc3 is 0V Thereby a potential relationship that prevents the toner having positive polarity from adhering to the transfer roller 5 is established.

If Vtth is the threshold of the potential difference with which discharge is generated between the transfer roller 5 and the photosensitive drum 1, the voltages may be controlled so that Vtc−Vdc3<Vtth is satisfied in the cleaning operation. Thereby it can be prevented that charges of the toner charged to the opposite polarity (positive polarity) increase in the transfer portion. In Embodiment 1, Vtc is +100V, Vdc3 is 0V, and Vtth is 600V. Thereby it can prevent the toner from becoming strong positive polarity by discharge in the transfer portion.

By performing the above-mentioned cleaning operation for at least one cycle of the charging roller 2, the toner on the charging roller 2 can be cleaned. The time of the cleaning operation can be changed in accordance with the operation environment of the image forming apparatus 100, the type of the external additive, and the like.

Brush Member

Figure 7:
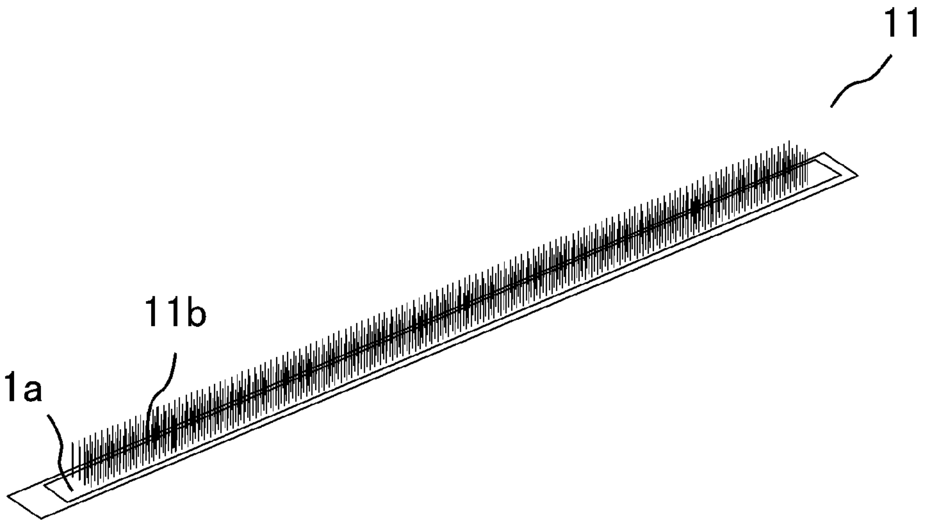
FIG. 7 is a diagram for describing a brush of Embodiment 1.

An example of applying the present invention to an image forming apparatus equipped with a contact member, which contacts with the surface of the photosensitive drum 1 on the downstream side of the transfer portion and on the upstream side of the charging portion in the rotating direction of the photosensitive drum 1, will be described. An example of the contact member is a brush member 11, as illustrated in FIG. 7. The brush member 11 is a collection member that selectively collects paper dust and allows toner to pass. The brush member 11 is, for example, a member constituted of a base fabric 11*a*, which is made of synthetic fibers containing carbon, woven with conductive yarns 11*b* made of conductive nylon 6. The conductive yarns 11*b* of which brush member 11 are, for example, 6.5 mm long and two denier thick, and are disposed at a 240 kF/inch$^2$ density, with a 1 mm entry amount. The thickness of the conductive yarn 11*b* is preferably 1 to 10 denier, and even more preferably 1 to 6 denier. The density of the conductive yarns 11*b* is preferably 150 kF/inch$^2$ or more.

Figure 8A:
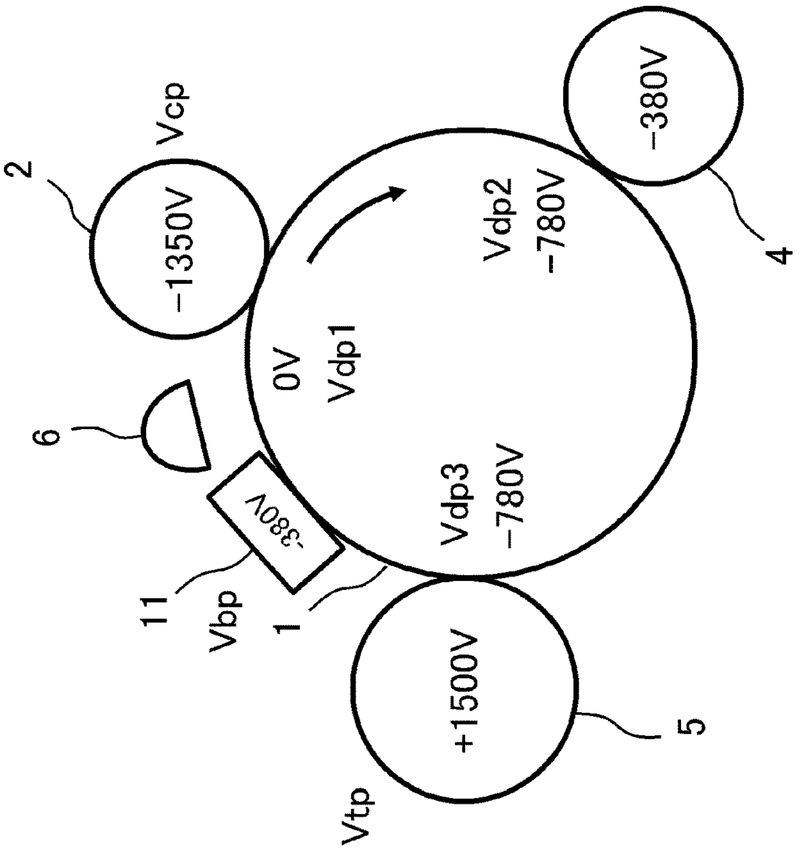
FIGS. 8A and 8B are diagrams for describing an image forming operation and an external additive coating operation in a case of using the brush of Embodiment 1.

A predetermined brush voltage, i.e., DC voltage, is applied to the brush member 11 from the brush voltage power supply 95 (FIG. 2). FIG. 8A indicates the surface potential formed on the photosensitive drum 1 in the image forming operation, and the applied voltage to each member, and FIG. 8B indicates the potential of the photosensitive drum 1 in the external additive coating operation, and the applied voltage to each member.

As indicated in FIG. 8A, if Vbp is the brush voltage in the image forming operation, the voltages are controlled so that Vbp>Vdp3 is satisfied in the image forming operation. Because of this, toner having positive polarity passes through the brush member 11, and toner on the photosensitive drum 1 is not collected by the brush member 11. In Embodiment 1, Vbp is −380V, and Vdp3 is −780V.

Figure 8B:
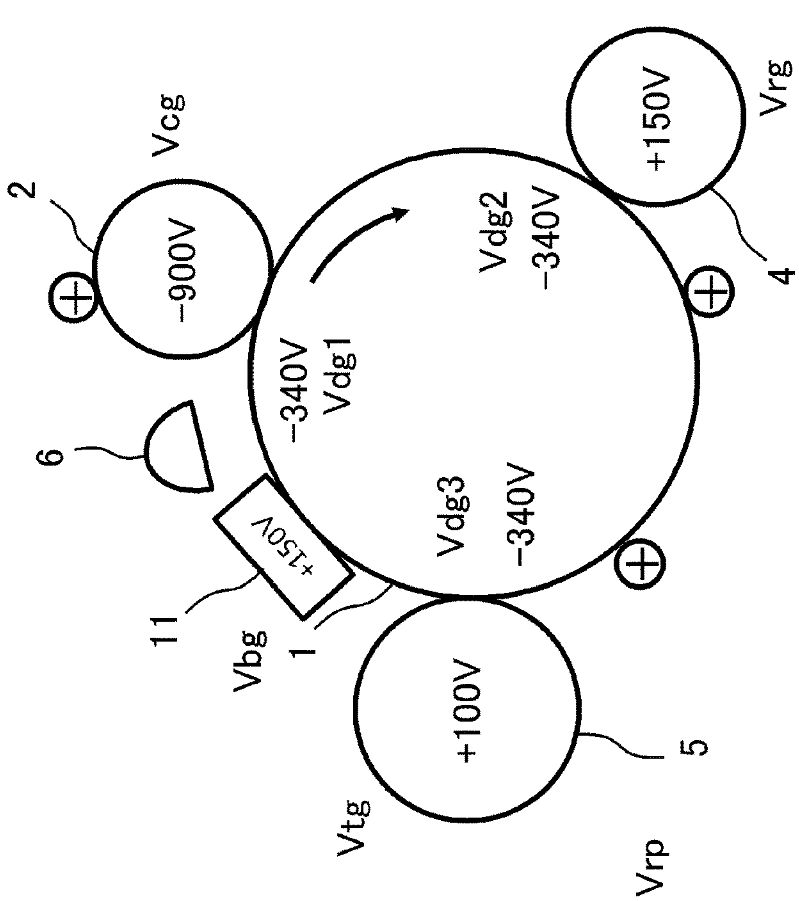

As indicated in FIG. 8B, if Vbg is the brush voltage in the external additive coating operation, the voltages are controlled so that Vbg>Vdg3 is satisfied. As a result, this prevents the toner and external additive having a positive polarity moving from the photosensitive drum 1 to the brush member 11. Since the toner and the external additive having a positive polarity pass through the brush member 11, the toner and the external additive on the photosensitive drum 1 are not collected by the brush member 11. In Embodiment 1, Vbg is +150V, and Vdg3 is −340V.

In the cleaning operation of the charging roller 2 as well, if Vbc is the brush voltage in the cleaning operation, the voltages are controlled so that Vbc>Vdc3 is satisfied, just like the case of FIG. 8B. Thereby it can be prevented that the toner charged to the opposite polarity (positive polarity) is transferred from the photosensitive drum 1 to the brush member 11. Potential relationships other than with the brush member 11 are as described in Embodiment 1.

Embodiment 2

Embodiment 2 will be described. In Embodiment 2, a member the same as Embodiment 1 is denoted with a same reference sign, and description thereof will be omitted. In Embodiment 2, the photosensitive drum 1 is exposed by the exposing apparatus 3 in the external additive coating operation, whereby the absolute value of the potential of the photosensitive drum 1 is decreased from before the exposing portion, and the toner is developed in the developing portion. In the developing portion, essentially toner having negative polarity is developed, but the external additive is also developed along with the toner. The amount of external additive to be developed is in proportion to the amount of toner to be developed. Therefore, by adjusting the exposure amount and changing the absolute value of the potential of the photosensitive drum 1, the amount of the external additive to be developed can be controlled. For example, in the case of using the image forming apparatus in a high temperature and high humidity environment, the coating amount of the external additive can be increased by adjusting the exposure amount, without increasing the execution time of the external additive coating operation.

The external additive coating operation of Embodiment 2 is an operation sequence to develop the toner on the photosensitive drum 1 in the developing portion, and then efficiently transfer the external additive contained in the toner to the charging roller 2 without generating a discharge in the transfer portion.

Figure 9:
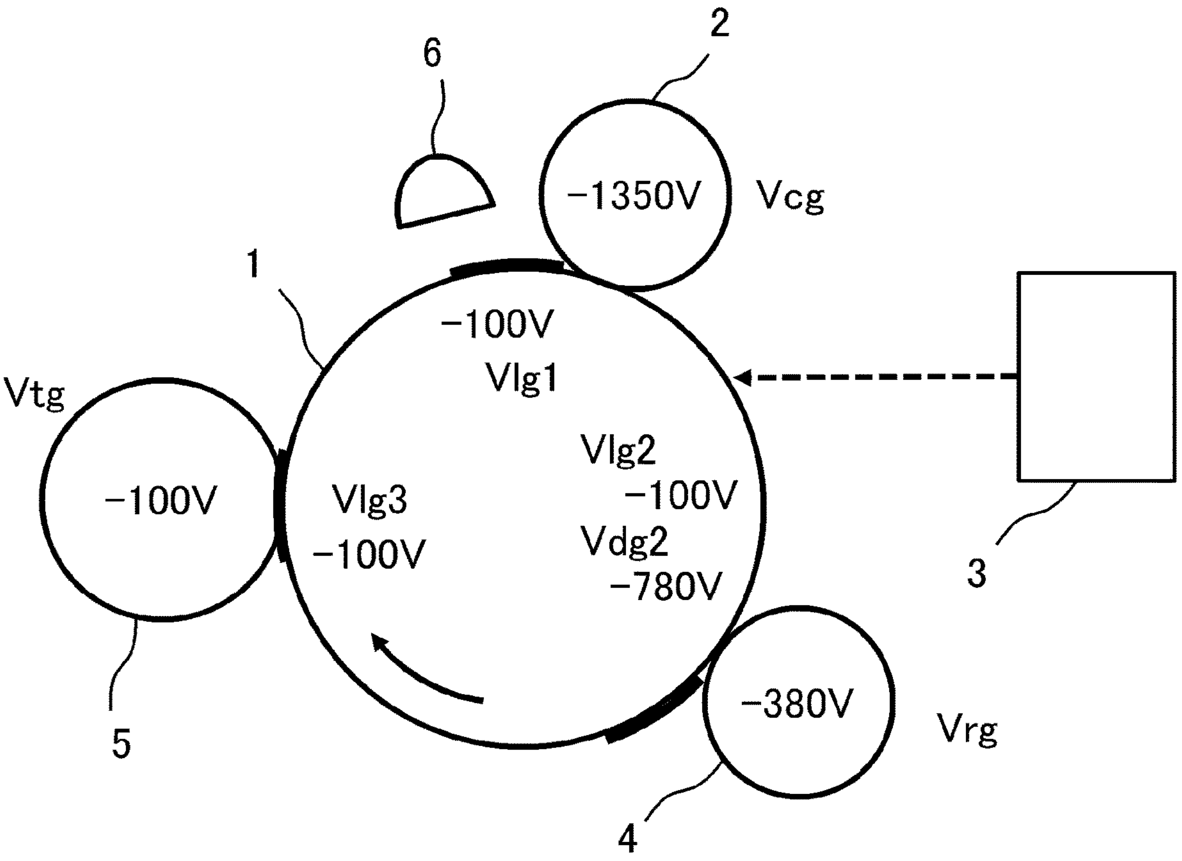
FIG. 9 is a diagram for describing an external additive coating operation of Embodiment 2.

FIG. 9 indicates the surface potential that is formed on the photosensitive drum 1 in the external additive coating operation of Embodiment 2, and the applied voltage to each member. It is assumed that Vlg1 is the surface potential immediately before the charging portion of the photosensitive drum 1 in the external additive coating operation, Vdg2 is the surface potential (dark area potential) immediately before the exposing portion, Vlg2 is the surface potential (bright area potential) immediately before the developing portion, and Vlg3 is the surface potential immediately before the transfer portion. It is also assumed that Vcg is the charging voltage in the external additive coating operation, Vrg is the developing voltage, and Vtg is the transfer voltage. In the external additive coating operation, the exposing apparatus 3 performs exposure on the entire range of the photosensitive drum 1 in a direction intersecting with the circumferential direction of the photosensitive drum 1 (rotation shaft direction), and the voltages are controlled so as to satisfy Vlg2>Vrg, Vlg1>Vcg, and Vtg=Vlg3. Thereby the toner containing the external additive is transferred from the developing apparatus 4 to the photosensitive drum 1, the external additive is transferred from the photosensitive drum 1 to the charging roller 2, and transfer of the external additive and toner from the photosensitive drum 1 to the transfer roller 5 is prevented. In Embodiment 2, the charging voltage Vcg=−1350V is applied in the external additive coating operation, so that the potential Vdg2 of the photosensitive drum 1 on the downstream side of the charging portion is set to −780V, and the potential Vlg2 of the photosensitive drum 1 in the exposing portion is set to −100V by exposure of the exposing apparatus 3. Then the developing voltage Vrg is set to −380V, and toner is developed in the developing portion.

Here the region to be exposed by the exposing apparatus 3, that is, the region where the toner is developed, is set such that the latitudinal width (one rotation of charging roller 2) is 25 mm, and the longitudinal width is the entire range of the imaging region. At the timing when the toner reaches the transfer portion, the transfer voltage Vtg=−100V is applied so as to be the same as the potential Vlg3=−100V of the photosensitive drum 1 in the transfer portion. By this potential relationship, the external additive having positive polarity and toner having a negative polarity are not transferred to the transfer roller 5.

At the timing when the toner reaches the pre-charging exposing portion, the pre-charging exposure by the pre-charging exposing apparatus 6 is stopped (OFF). Thereby the potential Vlg3=−100V of the photosensitive drum 1 in the transfer portion remains unchanged, and the potential Vlg1 of the photosensitive drum 1 in the charging portion becomes −100V, and in the charging portion, the external additive having positive polarity is transferred from the photosensitive drum 1 to the charging roller 2 by electrostatic force. Here an example of turning the pre-charging exposure OFF by the pre-charging exposing apparatus 6 was described, but the pre-charging exposure may be performed with an exposure amount that is less than the exposure amount by the pre-charging exposing apparatus 6 in the image forming operation.

In order to confirm the effect of Embodiment 2, the same verification as Embodiment 1 was performed in Embodiment 2 and in Comparative Example 2. In Embodiment 2, the external additive coating operation was performed on a brand-new image forming apparatus, and then the same evaluation as Embodiment 1 was performed. In Comparative Example 2, the same evaluation as Embodiment 1 was performed without performing the external additive coating operation on the brand-new image forming apparatus. Table 2 indicates a number of black spot lines that were generated in Embodiment 2 and in Comparative Example 2.

TABLE 2

| | FIRST TIME | SECOND TIME | THIRD TIME |
|---|---|---|---|
| COMPARATIVE EXAMPLE 2 | 5 LINES | 5 LINES | 6 LINES |
| EMBODIMENT 2 | 0 LINE | 0 LINE | 0 LINE |

As described in Table 2, in Embodiment 2, a number of black spot lines that were generated is 0, while in the Comparative Example 2, a number of black spot lines that were generated is 5 to 6, that is, performing the external additive coating operation has an effect of preventing the generation of black spots.

As described above, by performing the external additive coating operation on a brand-new image forming apparatus, adhesion of a foreign substance to the charging roller 2 can be prevented, whereby the generation of black spot images can be prevented.

In the external additive coating operation, the voltages may be controlled to satisfy Vlg1−Vcg<Vcth by increasing the charging voltage Vcg at the timing when the toner and the external additive reach the charging portion. In the present description, increasing the voltage V1 to voltage V2 means changing the voltage V1 to voltage V2 that satisfies the potential relationship of V2>V1, as described above. Vcth is a threshold of the potential difference at which discharge is generated between the charging roller 2 and the photosensitive drum 1. Thereby it can be prevented that the charging polarity of the external additive becomes the same polarity as the charging polarity of the toner in the charging portion. In Embodiment 2, it is assumed that the charging voltage Vcg is −1350V until the toner reaches the charging portion, and is changed to −600V at the timing when the toner reaches the charging portion. Thereby Vlg1−Vcg=500V is established, which is lower than the discharging threshold of Vcth=600V. As a result, this prevents the external additive having positive polarity, contained in the toner, from becoming negative polarity in the charging portion.

The exposure amount by the exposing apparatus 3 in the external additive coating operation may be set in accordance with the environment information, such as the temperature and humidity, detected by the environment sensor 96. For example, temperature may be detected by the environment sensor 96, and the exposure amount in the external additive coating operation may be increased as the temperature becomes higher. Further, humidity may be detected by the environment sensor 96, and the exposure amount in the external additive coating operation may be increased as the humidity becomes higher. In Embodiment 2, the exposure amount may be increased in a high temperature high humidity environment (temperature: 32.5° C.; humidity: 80%) in which black spots standout even more, and the exposure amount may be lowered in a low temperature low humidity environment in which black spots standout less.

In some cases, in Embodiment 2, toner may adhere to the charging roller 2 when the toner passes through the charging portion. Hence, just like Embodiment 1, the cleaning operation of the charging roller 2 may be performed after the external additive coating operation.

In the configuration of Embodiment 2 as well, a brush member 11, as illustrated in FIG. 7, may be included, just like Embodiment 1. In the case of the configuration including the brush member 11, the brush voltage Vbg in the external additive coating operation may be the same as the potential Vlg3 of the photosensitive drum 1 in the contact portion of the brush member 11 and the photosensitive drum 1. Thereby it can be prevented that toner and the external additive are transferred from the photosensitive drum 1 to the brush member 11, so that the brush member 11 does not collect the toner and the external additive.

In the configuration described in the above embodiments, the toner image formed on the photosensitive drum 1 is transferred to the recording material P (transfer target object) in the transfer portion, but the configuration of the image forming apparatus to which the present invention is applicable is not limited to this configuration. For example, the present invention is also applicable to an image forming apparatus configured such that a toner image is primarily transferred to an intermediate transfer belt (transfer target object) in the transfer portion, and the toner image is secondarily transferred from the intermediate transfer belt to the recording material P. Further, in the configuration described in the above embodiments, the image forming apparatus 100 includes the photosensitive drum 1, the charging roller 2 and the developing apparatus 4, but the present invention is also applicable to a process cartridge type image forming apparatus. In this case, when the charging roller 2, included in the process cartridge having the photosensitive drum 1, is in a brand-new state, the external additive coating operation can be performed on the charging roller 2 before starting the image forming operation with this process cartridge.

According to the present invention, image defects can be prevented in a cleanerless type and contact charging type image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-122745, filed on Jul. 27, 2023, which is hereby incorporated by reference herein in its entirety.

What is claimed is:

1. An image forming apparatus comprising:

a photosensitive drum which is rotatable;

a charging unit that rotates in contact with the photosensitive drum, and charges a surface of the photosensitive drum;

an exposing unit that exposes the surface of the photosensitive drum charged by the charging unit;

a developing unit that supplies toner containing an external additive which has a charging polarity that is an opposite polarity of a charging polarity of the toner to the surface of the photosensitive drum exposed by the exposing unit;

a transfer unit that transfers the toner, which has been supplied to the photosensitive drum by the developing unit, to a recording material; and a controller that controls the charging unit, the developing unit and the transfer unit, wherein, after the toner supplied to the surface of the photosensitive drum is transferred to the recording material, the developing unit is configured to collect toner remaining on the surface of the photosensitive drum, wherein the controller is configured to perform: an image forming operation to form an image on the recording material; and an external additive coating operation to transfer the external additive or the toner containing the external additive from the developing unit to the photosensitive drum, and transfer the external additive from the photosensitive drum to the charging unit, and wherein the controller is configured not to perform exposure by the exposing unit in the external additive coating operation, and configured to control voltages so as to satisfy:

$$Vrg > Vdg2$$

$$Vdg1 > Vcg$$

$$\mathrm{Vback\_g} > \mathrm{Vback\_p}$$

$$Vtg > Vdg3$$

$$Vtg - Vdg3 < Vtth,$$

where V1>V2 represents a potential relationship in which an electrostatic force, directed from a position of a potential V1 to a position of a potential V2, acts on particles having a same charging polarity as a charging polarity of the external additive, Vcg represents a charging voltage in the external additive coating operation, Vdg1 represents a surface potential of the photosensitive drum in the external additive coating operation, Vdg2 represents a surface potential of the photosensitive drum in a developing portion facing the developing unit in the external additive coating operation, Vdg3 represents a surface potential of the photosensitive drum in a transfer portion facing the transfer unit in the external additive coating operation, Vrg represents a developing voltage to be applied to the developing unit in the external additive coating operation, Vtg represents a transfer voltage to be applied to the transfer unit in the external additive coating operation, Vtth represents a threshold of a potential difference with which discharge is generated between the transfer unit and the photosensitive drum, Vback_g represents a potential difference between the developing voltage and the surface potential of the photosensitive drum in the developing portion in the external additive coating operation, and Vback_p represents a potential difference between the developing voltage and the surface potential of the photosensitive drum in the developing portion in the image forming operation.

2. The image forming apparatus according to claim 1, wherein the controller is configured to control voltages in the external additive coating operation so as to satisfy Vdg1−Vcg<Vcth, such that a charging polarity of the external additive is suppressed from becoming the same polarity as a charging polarity of the toner by the charging unit, where Vcth represents a threshold of a potential difference with which discharge is generated between the charging unit and the photosensitive drum.

3. The image forming apparatus according to claim 1, further comprising a pre-exposing unit that exposes a surface of the photosensitive drum on which transfer has been performed by the transfer unit, wherein the controller is configured not to perform exposure by the pre-exposing unit in the external additive coating operation, or configured to control an exposure amount by the pre-exposing unit to be less than an exposure amount by the pre-exposing unit in the image forming operation.

4. The image forming apparatus according to claim 1, further comprising a brush member that contacts with a surface of the photosensitive drum on which transfer has been performed by the transfer unit, wherein the controller is configured to control voltages in the external additive coating operation so as to satisfy Vbg>Vdg3, such that transfer of the external additive from the photosensitive drum to the brush member is suppressed, where Vbg represents a brush voltage to be applied to the brush member in the external additive coating operation.

5. The image forming apparatus according to claim 1, further comprising an acquiring unit that acquires information on an environment of the image forming apparatus, wherein the controller is configured to set an execution time of the external additive coating operation in accordance with the information on an environment acquired by the acquiring unit.

6. The image forming apparatus according to claim 5, wherein the acquiring unit is a sensor that detects temperature, and the controller is configured to increase the execution time of the external additive coating operation as temperature detected by the sensor becomes higher.

7. The image forming apparatus according to claim 5, wherein the acquiring unit is a sensor that detects humidity, and the controller is configured to increase the execution time of the external additive coating operation as humidity detected by the sensor becomes higher.

8. The image forming apparatus according to claim 1, wherein the charging unit and the photosensitive drum contact with each other while rotating in a same direction, and a peripheral speed of the charging unit is faster than a peripheral speed of the photosensitive drum.

9. The image forming apparatus according to claim 1, wherein the controller is configured to execute the external additive coating operation in a case where the charging unit is in an early stage of usage or in a brand-new state.

10. The image forming apparatus according to claim 1, wherein the control unit is configured to execute, after the external additive coating operation, a cleaning operation to transfer the toner adhering to the surface of the charging unit to the photosensitive drum.

11. The image forming apparatus according to claim 10, wherein the control unit is configured not to perform exposure by the exposing unit in the cleaning operation, and configured to control voltages so as to satisfy Vdc1>Vcc and Vrc>Vdc2, such that the toner is transferred from the charging unit to the photosensitive drum, and the toner is transferred from the photosensitive drum to the developing unit, where Vcc represents a charging voltage in the cleaning operation, Vdc1 represents a surface potential of the photosensitive drum in the cleaning operation, Vdc2 represents a surface potential of the photosensitive drum in the developing portion in the cleaning operation, and Vrc represents a developing voltage in the cleaning operation.

12. The image forming apparatus according to claim 11, wherein the control unit is configured to control voltages in the cleaning operation so as to satisfy Vdc1−Vcc>Vcth, such that the toner adhering to the charging unit is suppressed from being charged to an opposite polarity, where Vcth represents a threshold of a potential difference with which discharge is generated between the charging unit and the photosensitive drum.

13. The image forming apparatus according to claim 10, wherein the controller is configured to control voltages in the cleaning operation so as to satisfy Vtc>Vdc3, such that the toner charged to an opposite polarity is suppressed from being transferred from the photosensitive drum to the transfer unit, where Vtc represents a transfer voltage in the cleaning operation and Vdc3 represents a surface potential in the transfer portion of the photosensitive drum.

14. The image forming apparatus according to claim 13, wherein the control unit is configured to control voltages in the cleaning operation so as to satisfy Vtc−Vdc3<Vtth, such that increasing in charges of the toner charged to an opposite polarity in the transfer portion is suppressed.

15. The image forming apparatus according to claim 10, further comprising a brush member that contacts with a surface of the photosensitive drum on which transfer has been performed by the transfer unit, wherein the controller is configured to control voltages in the cleaning operation so as to satisfy Vbc>Vdc3, such that transfer of the toner charged to an opposite polarity from the photosensitive drum to the brush member is suppressed, where Vbc represents a brush voltage to be applied to the brush member in the cleaning operation, and Vdc3 represents a surface potential in the transfer portion of the photosensitive drum.

16. The image forming apparatus according to claim 10, further comprising a pre-exposing unit that exposes a surface of the photosensitive drum on which transfer has been performed by the transfer unit, wherein the controller is configured to perform exposure by the pre-exposing unit in the cleaning operation.

17. The image forming apparatus according to claim 1, wherein the transfer unit is configured to primarily transfer the toner supplied to the photosensitive drum by the developing unit to an intermediate transfer object, and secondarily transfer the toner transferred to the intermediate transfer object to the recording material.

* * * * *